UNITED STATES PATENT OFFICE.

WILLIAM MORRISON, OF DES MOINES, IOWA.

ELECTROLYTE FOR ALKALINE BATTERIES.

976,277.

No Drawing.

Specification of Letters Patent. Patented Nov. 22, 1910.

Application filed May 6, 1909. Serial No. 494,411.

*To all whom it may concern:*

Be it known that I, WILLIAM MORRISON, a citizen of the United States of America, and resident of Des Moines, Iowa, have invented a certain new and useful Improvement in Electrolytes for Alkaline Batteries, of which the following is a specification.

This invention relates to improvements in reversible galvanic batteries of the alkaline type, and has for its object the production of a battery in which the electrolyte is of such character that the active material of the anode, or negative-pole electrode, will be insoluble therein, both when the battery is charged and discharged.

In prior storage batteries employing an electrolyte of an alkali-metal hydroxid and zinc as an oxidizable electrode, the discharge of the battery causes oxidation and solution of the zinc, the electrolyte being thereby converted into a zincate. Such batteries require a large volume of electrolyte to dissolve the zinc. Upon charging them, the zinc tends to plate out on the lowermost portions of the grid or carrier, the zincate being denser and heavier toward the bottom of the cell. As the zinc content of the electrolyte decreases upon charging, the zinc first plates out smoothly from the concentrated solution, but as the solution becomes weak, if the normal rate of charging is maintained, the deposit becomes porous or flocculent and non-adherent, and tends to bridge or tree across between the opposite electrodes. Such batteries must be charged very slowly to give a dense adherent deposit. Furthermore, the alkaline solution gradually loses its capacity to re-dissolve the zinc, and the deposit of zinc adheres less firmly at each re-charge. While the adhesion of the zinc may be increased by amalgamating or coating the grid or support with mercury, it is difficult in practice to maintain the mercury in place, as it gradually falls to the bottom of the cell.

I have discovered that chromium oxid or hydroxid, when added to or present in an alkaline electrolyte, either as such or combined as a chromite, acts to largely or entirely prevent solution of zinc therein. I therefore employ as the electrolyte of a storage battery having a zinc anode, a solution of an alkali-metal hydroxid containing or having combined therewith as chromite, an oxid or hydroxid of chromium, preferably an aqueous solution of potassium hydroxid containing potassium chromite.

The new electrolyte may be prepared in several different ways: One method consists in re-dissolving the precipitate, or compound, produced by mixing strong solutions of potassium hydroxid and chromium hydroxid, in an excess of strong potassium-hydroxid solution. This electrolyte must be used in sufficient volume to provide the amount of combined chromium necessary to prevent solution of the zinc. The electrodes are preferably initially discharged and re-charged in a volume of this electrolyte several times that required in a cell having electrodes which have undergone several discharges and re-charges.

Another method consists in mixing strong aqueous solutions of potassium hydroxid and potassium chromate, for example four volumes of the hydroxid and one of the chromate. The dissolved chromate is then electrolytically reduced, the passage of the current causing the color of the solution to change from yellowish to greenish, indicating reduction of the chromate, in greater or less amount, to the chromite.

The new electrolyte may be used with a zinc anode, or oxidizable electrode, and with any suitable cathode, or depolarizing element, the active material of which is insoluble in the solution. As a specific illustration, a commercial cell may be made by using an anode initially consisting of a body of zinc oxid carried by or secured upon an inert conductor or support, for example one of copper, and a cathode the active material of which initially consists of a finely-divided metal, or the lower oxid of a metal, which is negative to zinc and which, as well as its oxid or oxids, is insoluble in an alkaline electrolyte. In charging the cell, zinc is reduced at the negative-pole electrode and the depolarizer of the positive-pole electrode is carried to the desired degree of oxidation.

I claim:

1. In a reversible galvanic battery, a zinc negative-pole electrode, a positive-pole electrode, and an alkaline electrolyte containing an oxygen-compound of a metal capable of rendering the zinc substantially or largely insoluble in the electrolyte.

2. In a reversible galvanic battery, a zinc negative-pole electrode, a positive-pole electrode, and an alkaline electrolyte containing a chromium compound.

3. In a reversible galvanic battery, a zinc negative-pole electrode, a positive-pole electrode, and an alkaline electrolyte containing a chromium-oxygen compound.

4. In a reversible galvanic battery, a zinc negative-pole electrode, a positive-pole electrode, and an alkaline electrolyte containing an alkali-metal chromite.

5. In a reversible galvanic battery, a zinc negative-pole electrode, a positive-pole electrode, and an alkaline hydrate electrolyte containing a compound capable of rendering the zinc substantially or largely insoluble in the electrolyte.

Signed by me at Chicago, Illinois, this 1st day of May 1909.

WILLIAM MORRISON.

Witnesses:
 CLARENCE E. TAYLOR,
 E. H. CLEGG.